3,351,202
METHOD OF FRACTIONATING MIXTURES OF PARTICULATE SOLID MATERIALS
William Resnick, Haifa, and Mordechai Avriel, Kiryat Yam, Israel, assignors to Technion Research and Development Foundation, Ltd., Haifa, Israel, a corporation of Israel
Continuation of application Ser. No. 331,345, Dec. 16, 1963. This application Oct. 17, 1966, Ser. No. 587,346
8 Claims. (Cl. 209—474)

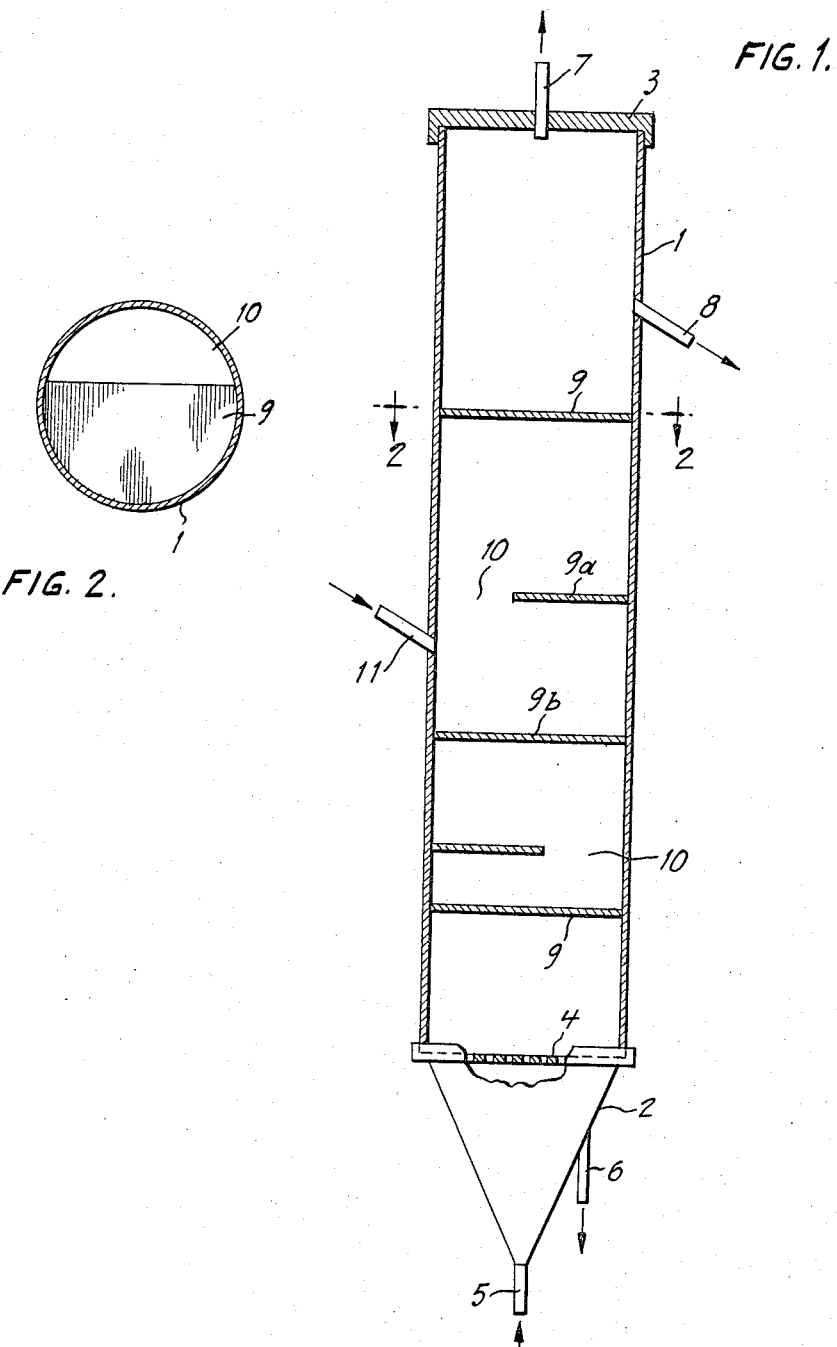

ABSTRACT OF THE DISCLOSURE

The invention consists in a method of fractionating mixtures of particulate solids into fractions of, respectively, finer and coarser particles, and/or specifically lighter and heavier particles. A gas is passed upwardly through a plurality of zones, the coarser particles dropping down, and the finer particles rising and being removed.

---

This application is a continuation of copending application Ser. No. 331,345, filed Dec. 16, 1963, now abandoned.

The invention is based on the observation that in a fluidized bed finer and/or specifically lighter particles tend to rise to the top and ultimately to be discharged as overflow or overhead, while coarser and/or specifically heavier particles sink to the bottom of the bed and are ultimately discharged as the underflow or bottoms.

In the separating method according to the invention, the mixture of solids to be fractionated is fed, continuously or in batches, into a median zone of fluidized bed constituted by particles of the same kind as those of the mixture and a fraction of finer and/or specifically lighter particles is withdrawn, continuously or in batches, from the top of the bed, and a fraction of coarser and/or specifically heavier particles from the bottom of the bed.

In a preferred embodiment of the invention, fractionation is effected by means of a series of fluidized beds preferably superposed upon one another, the feed being introduced into a bed about midway in the series.

The series of fluidized beds may consist either of a plurality of separate beds or of a column subdivided by baffles into a series of superposed chambers intercommunicating for admitting the downward flow of the coarser and/or specifically heavier particles and the upward flow of the gaseous fluidizing medium and the finer and/or specifically lighter particles.

In a column serving for the purposes of the present invention, the design of the passages leading from chamber to chamber past the baffles is immaterial. For example, the baffles may extend to the wall of the column over the greater part of their circumference except for a segment which is left open; or the baffles may be discs substantially similar in shape to the cross-section of the column but smaller than the latter, whereby a gap is left between the circumference of each baffle and the wall of the column; or the baffles may extend across the entire cross-section of the column and have one or more openings.

In some cases, depending on the nature of the material to be fractionated, it may be advantageous to provide unequal vertical distances between consecutive baffles, preferably so that the distance between each two baffles increases in the upward direction.

In the performance of the method according to the invention it is sometimes preferred to form a fixed bed of the coarser or specifically heavier particles at the bottom of the column, through which bed the incoming gaseous fluidizing medium passes on its way upwards. This fixed bed is a kind of filter retaining finer and/or specifically lighter particles so that the output of the underflow at the bottom of the column comprises as far as possible the desired range of coarser and/or specifically heavier fraction only.

The fractions thus obtained by a first fractionating operation may be subjected to further fractionation in a similar manner, if it is desired to separate the original mixture into a larger number of sharply defined fractions.

A fluidized-bed column for use in the method according to the invention is illustrated, by way of example only, in the accompanying drawings in which:

FIG. 1 is an axial section of the column;
FIG. 2 is a horizontal section thereof on line II—II of FIG. 1.

The column here illustrated comprises an upright cylindrical shell 1 having a conical bottom 2, and a lid 3. Between the bottom 2 and the column 1 a perforated plate 4 is interposed. At its lowest point the conical bottom 2 has an inlet 5 for the gaseous fluidizing medium, e.g. air, and at a somewhat higher level a discharge duct 6 for the coarser and/or specifically heavier fraction. The lid 3 is provided with an outlet 7 for the spent gaseous fluidizing medium, while a short distance beneath the lid a lateral discharge duct 8 for the overflow is provied in the wall of the column 1.

In the example here illustrated the column contains five baffles 9, formed each by a circular disc (see FIG. 2) of which a segment is cut off so as to leave a port 10 for the upward passage of fluidizing medium and finer and/or specifically lighter fraction, and a downwards passage of the heavier fraction. The parts 10 are angularly staggered by 90° from baffle to baffle, as shown in FIG. 1. Both the ascending solids and gas and the descending solids are thus compelled to travel along a tortuous path.

About in the middle of the height of the column 1 between the baffles 9a and 9b, a feed inlet 11 is connected to the column.

The invention is illustrated by the following examples to which it is not limited.

Example 1

The column was designed as described above with reference to the drawings. The column was made of a transparent polymethyl methacrylate ("Perspex," trademark). It had an inner diameter of 63 mm. and a height of 1.30 m., measured from plate 4 to the lid 3. It contained five baffles whose mutual distances grew from baffle to baffle in the upward direction.

The feed was a sand mixture of substantially equal parts by weight of a coarse fraction of a particle size of 30–40 mesh, and a fine fraction of a particle size of 70–100 mesh. An attempt was made to separate these two fractions from each other as completely as possible in one operation, with air as fluidizing gas. The following Table I shows the extent to which the attempt succeeded:

TABLE I

| Rate of air-flow (liter/second) | Rate of feed (g./second) | Underflow (percent of coarse particles) | Overflow (percent of fine particles) |
|---|---|---|---|
| 32 | 200 | 82.0 | 92.5 |
| 37 | 200 | 67.0 | 95.0 |
| 44 | 200 | 66.7 | 97.5 |

It is seen that the recovery of coarse particles in the underflow, i.e. the uniformity of the fraction as regards particle size, decreases as the rate of flow of the fluidizing air increases, and conversely, the recovery of fine particles in the overflow increases with the rate of the flow of the fluidizing air.

The operator can thus determine in each particular case the optimal rate of flow of fluidizing gas appropriate to the mixture to be fractionated and to the desired sharpness of the division between the fractions.

*Example 2*

The feed was a mixture of substantially equal parts by weight of sand having a bulk density of 2.65 g./cc. and an average particle size of 20–30 mesh, and an organic material having a bulk density of 1.44 g./cc. and the same average particle size as the sand.

Fractionation according to specific gravity gave the results tabulated in Table II below:

TABLE II

| Rate of airflow (liter/second) | Rate of feed (g./second) | Underflow (percent of sand) | Overflow (percent of organic matter) |
|---|---|---|---|
| 54 | 220 | 99.9 | 91.5 |
| 65 | 260 | 99.9 | 89.5 |
| 78 | 320 | 99.9 | 87.3 |

This table shows the curious result that while the underflow was practically pure sand irrespective of the rate of flow of the fluidizing air, the proportion of organic matter in the overflow dropped as the rate of flow of fluidizing gas increases. This phenomenon was probably due to some part of the organic matter being carried off with the fluidizing gas through the gas outlet 7, which could not be recovered at the discharge duct 8.

What is claimed is:

1. A method of fractionating mixtures of particulate solids having coarse and fine particles, which comprises providing means forming a plurality of at least three superposed zones in communication with each other and separated by a plurality of baffles therebetween defining an upward tortuous path from one side of a zone to another side of an adjacent zone, the space between said baffles increasing in an upward direction and said baffles having openings of limited size only at the sides thereof, introducing a mixture of particulate solids into one of said zones, introducing an inert gas at ambient temperatures into the lowermost zone at a sufficient velocity to fluidize fine particles of said mixture, said velocity being sufficiently low to cause the coarsest particles to fall down into the lowermost zone and to form a bed therein, periodically discharging said coarsest particles from the bottom of said lowermost zone, causing a mixture containing said gas and said fine particles to rise from said intermediate zone into the uppermost zone and discharging said fine particles laterally therefrom, and removing said gas from the uppermost zone.

2. The method according to claim 1 characterized in that said zones are in a vertical column.

3. A method according to claim 1 characterized in that the vertical distances between successive baffles in the zones above the lowermost zone increase in an upward direction.

4. A method according to claim 1 characterized in that the areas of communication between successive zones are displaced angularly about 90°.

5. A method according to claim 1 characterized in that said zones are cylindrical in horizontal section and of uniform diameter.

6. A method according to claim 1 characterized in that the zones are defined by horizontal disks having a sector removed therefrom.

7. A method according to claim 1 characterized in that the diameters of said intermediate and upper zones are uniform.

8. The method according to claim 1, characterized in that said zones are in a vertical column, the vertical distances between successive baffles in the zones above the lowermost zone increase in an upward direction, openings between successive zones are staggered causing the flow of said mixture of gas and particles to follow a tortuous path upwardly and laterally from side to side, the areas of communication between successive zones are displaced angularly about 90°, said zones are cylindrical in horizontal section and of uniform diameter, the zones are defined by horizontal disks having a sector removed therefrom, and the diameters of said intermediate and upper zones are uniform.

References Cited

UNITED STATES PATENTS

| 2,483,485 | 10/1949 | Barr | 209—140 |
| 2,621,118 | 12/1952 | Cyr et al. | 34—10 X |
| 2,666,526 | 1/1954 | Odell et al. | 209—138 X |
| 3,294,236 | 12/1966 | Lagarias | 209—139 |

HARRY B. THORNTON, *Primary Examiner.*

TIM R. MILES, *Examiner.*